United States Patent

Newsom et al.

(10) Patent No.: US 8,316,670 B2
(45) Date of Patent: Nov. 27, 2012

(54) GLASSWARE MOLD COOLING AIR SUPPLY

(75) Inventors: Daniel L. Newsom, Oak Harbor, OH (US); Richard H. Garnes, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 225 days.

(21) Appl. No.: 12/764,572

(22) Filed: Apr. 21, 2010

(65) Prior Publication Data

US 2011/0259054 A1 Oct. 27, 2011

(51) Int. Cl.
*C03B 9/38* (2006.01)
(52) U.S. Cl. ............................................ 65/267; 65/355
(58) Field of Classification Search .............. 65/261, 65/267, 355, 319, 348
See application file for complete search history.

(56) References Cited

U.S. PATENT DOCUMENTS

| | | | |
|---|---|---|---|
| 3,586,491 A | | 6/1971 | Mennitt |
| 4,361,434 A | * | 11/1982 | Schneider ........................ 65/265 |
| 4,557,744 A | * | 12/1985 | Fenton et al. ................... 65/29.1 |
| 4,701,203 A | * | 10/1987 | Schneider ........................ 65/265 |
| 4,842,637 A | * | 6/1989 | Bolin et al. ....................... 65/265 |
| RE34,048 E | * | 9/1992 | Bolin ................................ 65/265 |
| 5,516,352 A | | 5/1996 | Bogert et al. |
| 6,442,976 B1 | | 9/2002 | Flynn |
| 7,134,301 B2 | | 11/2006 | Meyer et al. |
| 7,296,442 B2 | | 11/2007 | Flynn |
| 2006/0150681 A1 | | 7/2006 | Giraldo |
| 2007/0227192 A1 | | 10/2007 | Meyer et al. |
| 2008/0282739 A1 | | 11/2008 | Cramer |

FOREIGN PATENT DOCUMENTS

| | | |
|---|---|---|
| EP | 0293661 | 12/1988 |
| EP | 2011768 A2 | 1/2009 |
| GB | 1122899 | 8/1968 |
| GB | 2277082 A | 10/1994 |

* cited by examiner

*Primary Examiner* — Matthew Daniels
*Assistant Examiner* — Cynthia Szewczyk

(57) ABSTRACT

A glassware forming machine includes a machine section box having a cooling air outlet opening, at least one mold-carrying arm disposed above the section box and movable between mold-open and mold-closed positions, and means for delivering cooling air from the outlet opening to the mold arms. The machine in accordance with this aspect of the disclosure is characterized in that the means for delivering cooling air includes a valve plate mounted on the section box to pivot around an axis and having a valve plate opening that registers with the outlet opening in the section box. A pressure plate is mounted on the mold-carrying arm overlying the valve plate and has a pressure plate opening that registers with the valve plate opening. A coupling between the valve plate and the pressure plate pivots the valve plate on the section box as a function of motion of the mold-carrying arm between the mold-open and mold-closed positions such that cooling air is continuously fed to the mold-carrying arm through the valve plate and the pressure plate. The coupling preferably is a lost motion coupling such that motion of the mold arm is not imparted to the valve plate during initial motion in either the opening or the closing direction.

9 Claims, 5 Drawing Sheets

GLASSWARE MOLD COOLING AIR SUPPLY

The present disclosure is directed to supply of cooling air to the molds of a glassware forming machine, and more particularly to supply of cooling air to the glassware molds as function of mold position.

BACKGROUND AND SUMMARY OF THE DISCLOSURE

Glassware molds in a glassware molding machine typically are mounted on mold arms that are movable, typically pivotal, between an open position in which segments of the glassware molds are spaced from each other and a closed position in which the mold segments are brought together to form the glassware mold. Cooling fluid such as air is directed to the mold segments to cool the molds during operation. A general object of the present disclosure is to provide a simple and inexpensive arrangement for supplying cooling air to the molds of a glassware forming machine, and particularly one in which the quantity of cooling air fed to the molds can readily be optimized in the open position of the mold arms, the closed position of the mold arms, and/or mold arm positions between the open and closed positions.

The present disclosure embodies a number of aspects that can be implemented separately from or in combination with each other.

A glassware forming machine in accordance with one aspect of the present disclosure includes a machine section box having an upwardly directed cooling air outlet opening. At least one mold-carrying arm is disposed above the section box and movable between mold-open and mold-closed positions. An air manifold is carried by the mold arm overlying the section box and the outlet opening for delivering cooling air to at least one mold carried by the mold arm. The manifold has a cooling air inlet opening aligned with the cooling air outlet opening of the section box. A valve plate is mounted on the section box for movement overlying the section box outlet opening. The valve plate has a valve plate opening aligned with the outlet opening. The valve plate is operatively coupled to the mold arm such that position of the valve plate, and overlap between the outlet opening and the valve plate opening, varies with motion of the mold arm between the mold-closed and mold-open positions. The valve plate preferably is operatively coupled to the mold arm by a lost motion coupling.

A glassware forming machine, in accordance with another aspect of the present disclosure, includes a machine section box having a cooling air outlet opening, at least one mold-carrying arm disposed above the section box and movable between mold-open and mold-closed positions, and means for delivering cooling air from the outlet opening to the mold arms. The machine in accordance with this aspect of the disclosure is characterized in that the means for delivering cooling air includes a valve plate mounted on the section box to pivot around an axis and having a valve plate opening that registers with the outlet opening in the section box. A pressure plate is mounted on the mold-carrying arm overlying the valve plate and has a pressure plate opening that registers with the valve plate opening. A coupling between the valve plate and the pressure plate pivots the valve plate on the section box as a function of motion of the mold-carrying arm between the mold-open and mold-closed positions such that cooling air is continuously fed to the mold-carrying arm through the valve plate and the pressure plate. The coupling preferably is a lost motion coupling such that motion of the mold arm is not imparted to the valve plate during initial motion in either the opening or the closing direction.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
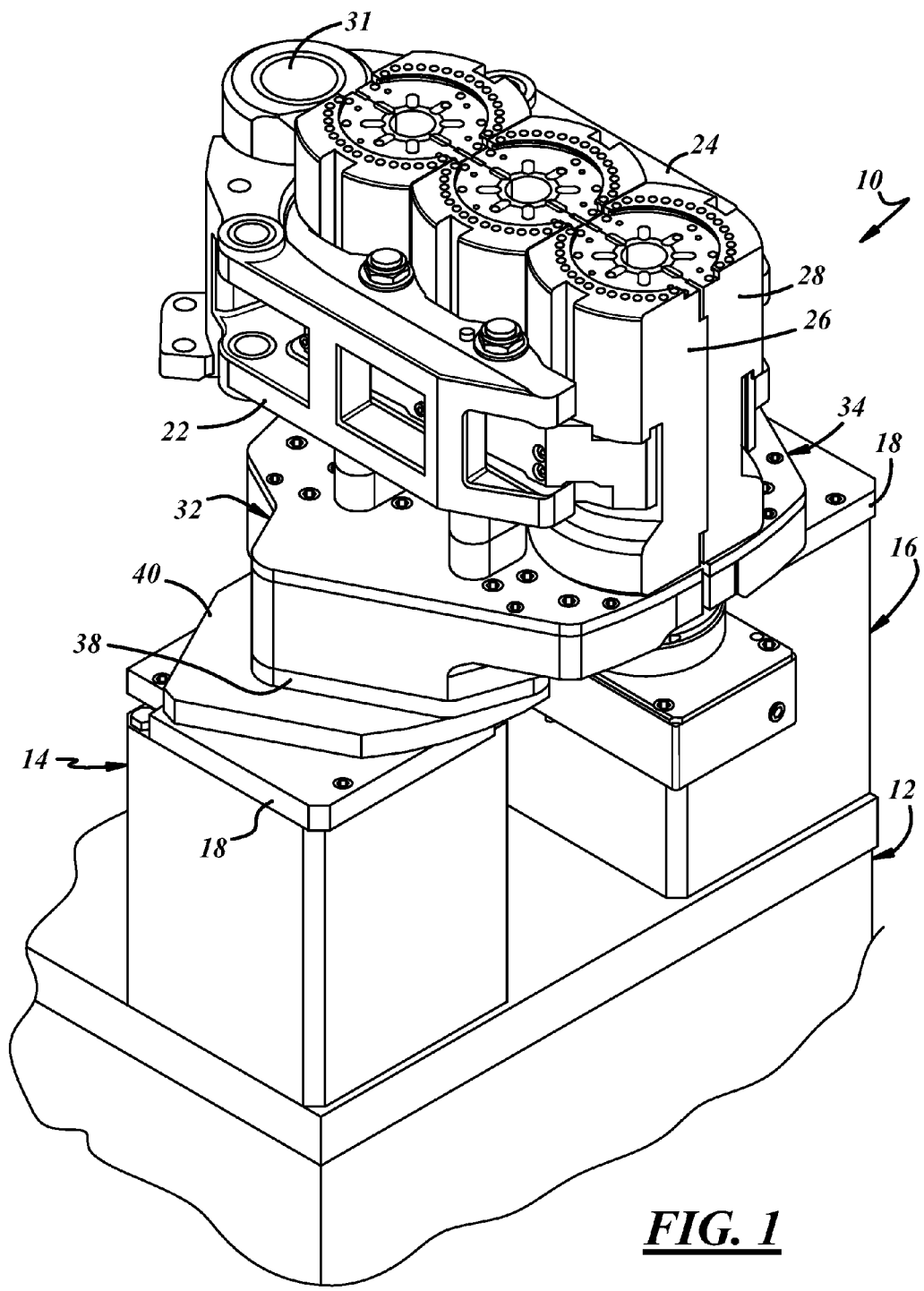
FIG. 1 is a fragmentary perspective view of the blow mold section of a glassware forming machine that embodies a mold cooling air supply in accordance with an exemplary embodiment of the disclosure.
Figure 2:
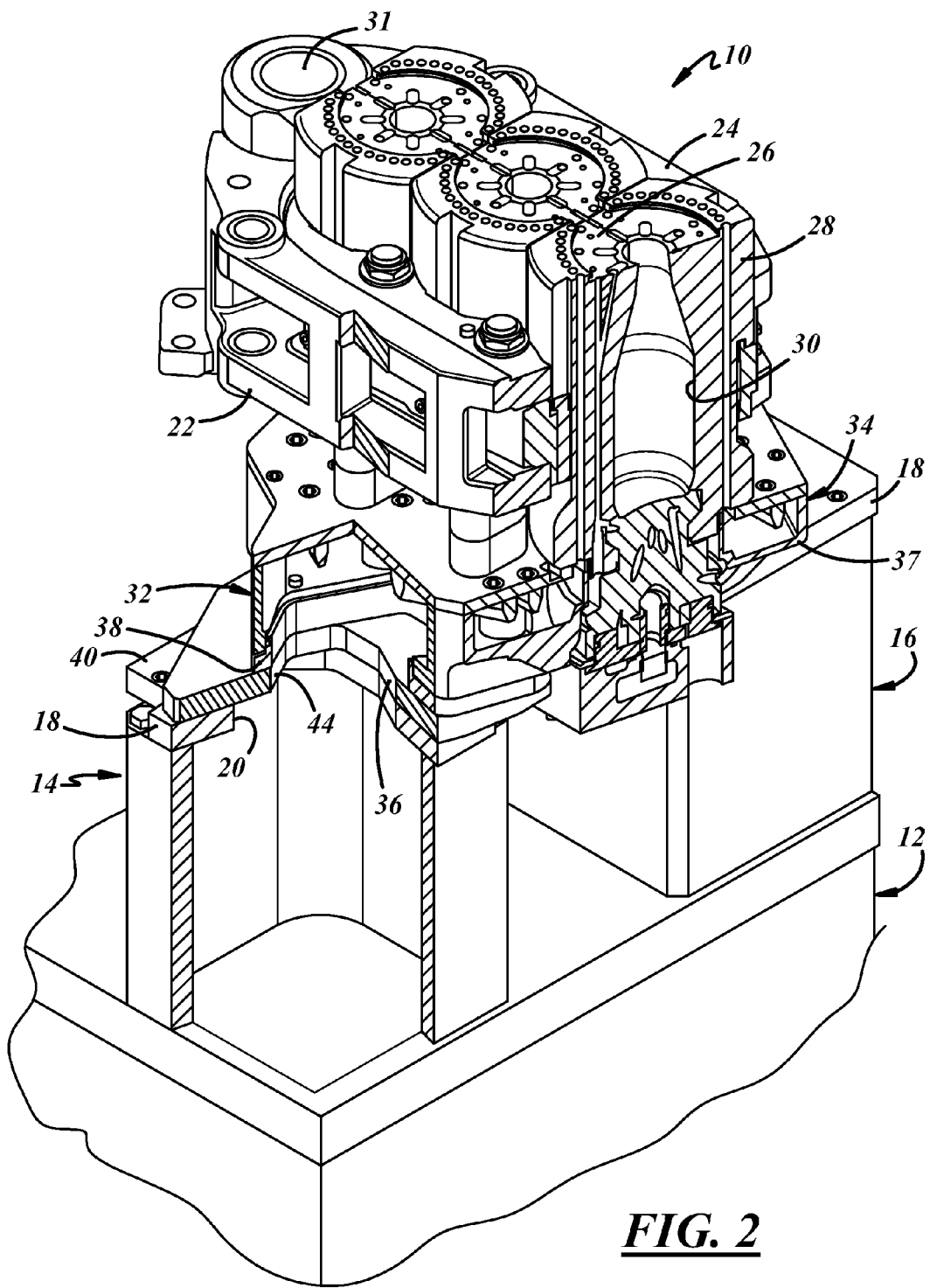
FIG. 2 is a fragmentary partially sectioned view of the blow mold station in FIG. 1.
Figure 3:
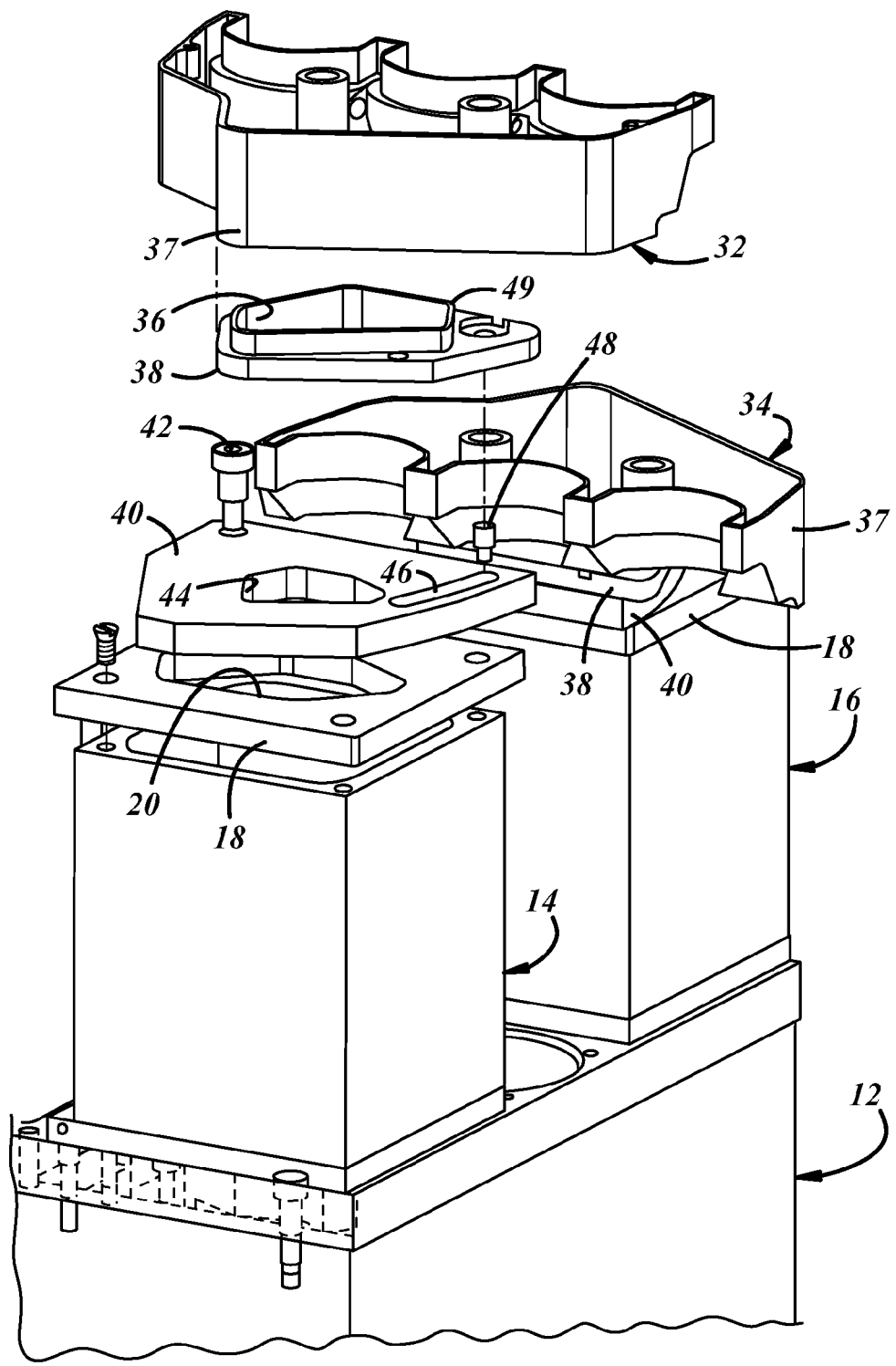
FIG. 3 is a partially exploded perspective view of the blow mold station in FIGS. 1 and 2 featuring a glassware mold cooling air supply in accordance with the exemplary embodiment of the disclosure.

FIGS. 1-3 illustrate the blow mold station 10 of a glassware forming machine equipped with a mold cooling air supply in accordance with an exemplary embodiment of the present disclosure. A machine section box 12 is connected to a suitable supply of cooling air, often referred to as cooling wind, such that the inside of the section box is at elevated air pressure. Section box 12 may have a pair of towers 14, 16. Towers 14, 16 are hollow and terminate in respective upper end plates 18. A cooling air outlet opening 20 is formed in each end plate 18. Towers 14, 16, end plates 18 and outlet openings 20 preferably are mirror images of each other. A pair of molds arms 22, 24 each carry at least one respective glassware mold section 26, 28. In the closed positions of the glassware mold sections illustrated in FIGS. 1-2, the mold sections cooperate to form a glassware mold cavity 30. Mold arms 22, 24 are mounted on a suitable structure, such as a pivot post 31, for movement between the mold-closed positions illustrated in FIGS. 1-2 and mold-open positions in which the mold sections are spaced from each other for removing the molded article of glassware. Exemplary structure for selectively opening and closing the mold arms is disclosed in U.S. 2008/0282739A1.

A pair of air manifolds 32, 34 are carried by respective mold arms 22, 24 for receiving cooling air from section box 12 and delivering the cooling air to cooling air passages in mold sections 26, 28. (The specific mold section configurations and mold section cooling air passage configurations illustrated in the drawings are merely exemplary.) Manifolds 32, 34 preferably are mirror images of each other. Each manifold 32, 34 has a shell 37 with a downwardly facing cooling air inlet opening 36 aligned with and overlying an associated cooling air outlet opening 20 in tower end plates 18. This manifold cooling air inlet opening in the exemplary embodiment is formed in a pressure plate 38 mounted on the underside of manifold shell 37. Beneath each pressure plate 38, between the pressure plate and the associated tower end plate 18, is a valve plate 40. Each valve plate 40 is mounted to the underlying end plate 18 by an associated pivot pin 42, so that each valve plate is pivotal with respect to the underlying end plate 18 around the axis of the associated pin 42. Each valve plate 40 has an associated valve plate opening 44 that overlies and is aligned with the underlying outlet opening 20.

Figure 7:
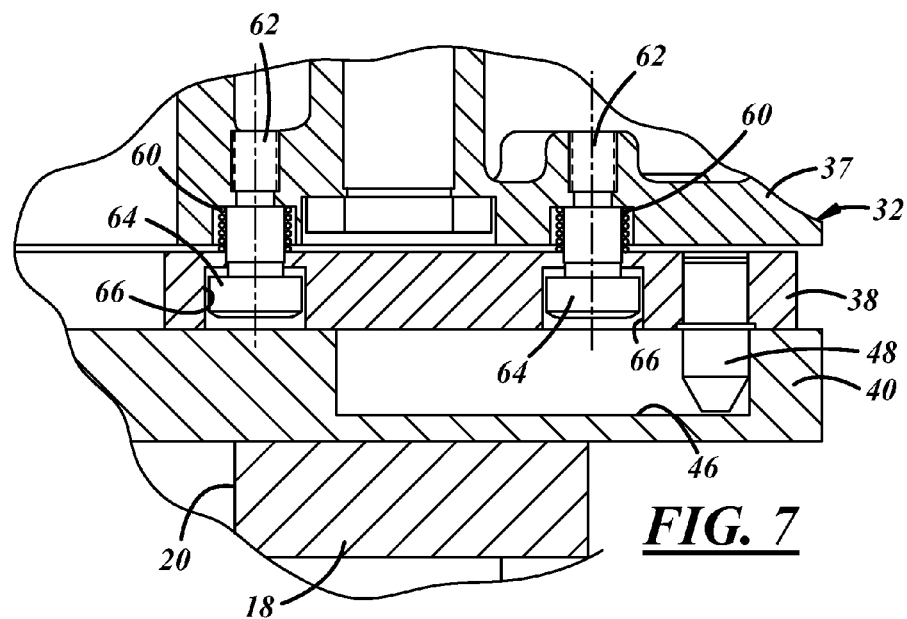
FIG. 7 is a fragmentary sectional view taken substantially along the line 7-7 in FIG. 4.

Each valve plate 40 has an arcuate slot 46 that, in assembly, is concentric with the axis of mold arm pivot post 31 (FIGS. 1 and 2). A pin 48 extends downwardly from each pressure plate 38 into the slot 46 of the underlying valve plate 40. At least one spring 60 (FIG. 7) is operatively disposed between manifold shell 37 and the underlying pressure plate 38 to bias the pressure plate against the associated valve plate 40. As illustrated in FIG. 7, pressure plate 38 preferably is suspended beneath manifold shell 37 by a pair of bolts 62, with the heads 64 of the bolts being received in associated pockets 66 in pressure plate 38. A coil spring 60 surrounds the shank of each bolt 62 and biases pressure plate 38 downwardly with respect to manifold shell 37 against the opposing face of valve plate 40. Pressure plate opening 36 may be surrounded by an upwardly extending lip 49 that is received in an opening 50 in the bottom wall of manifold shell 37 to reduce air leakage. The respective valve plates 40 and pressure plates 38 preferably are mirror images of each other, and the respective pressure plates 38 preferably are mirror images of each other.

Figure 4:
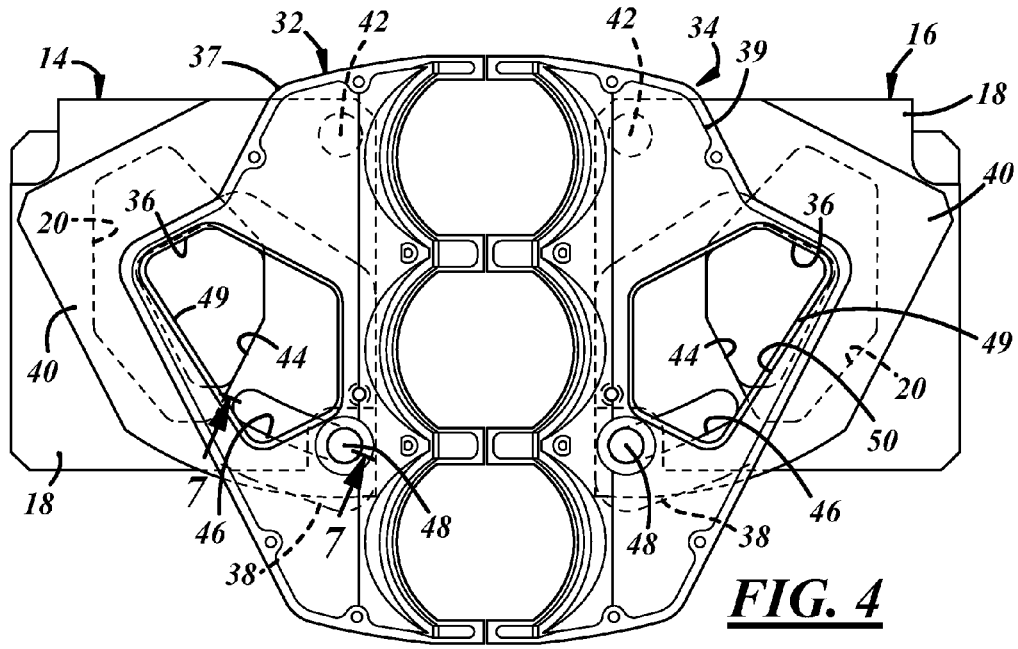
FIG. 4 is a top plan view of the cooling air manifolds and cooling air supply in the embodiment of FIGS. 1 and 3 with the mold arms in the mold-closed position.
Figure 5:
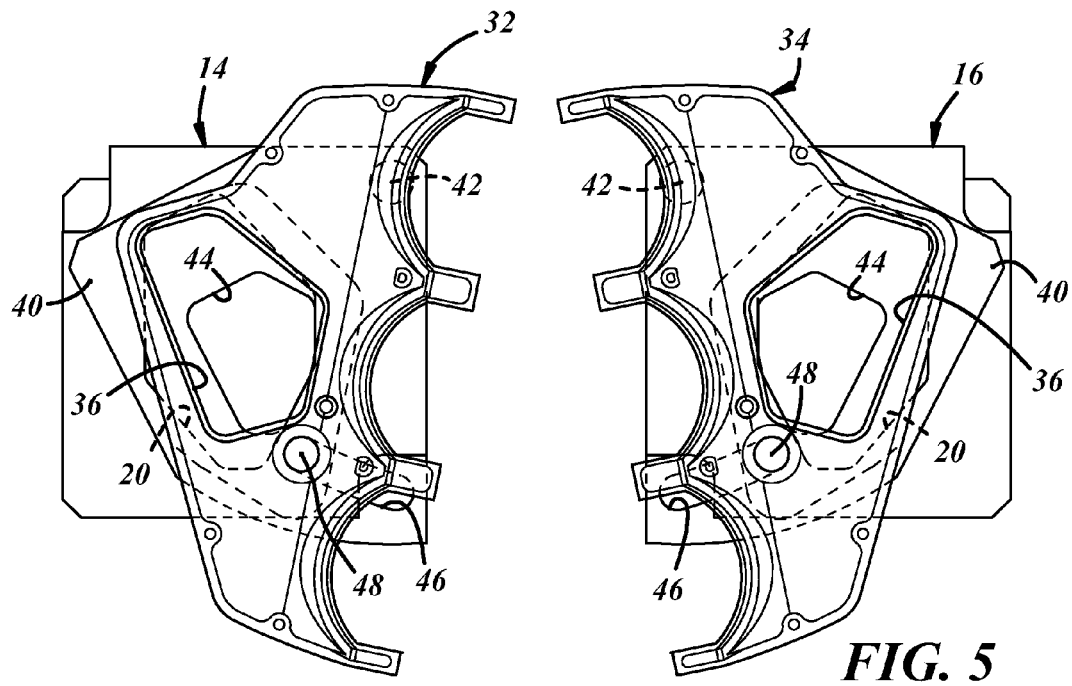
FIG. 5 is a top plan view similar to that of FIG. 4 but with the mold arms in a partially open position.
Figure 6:
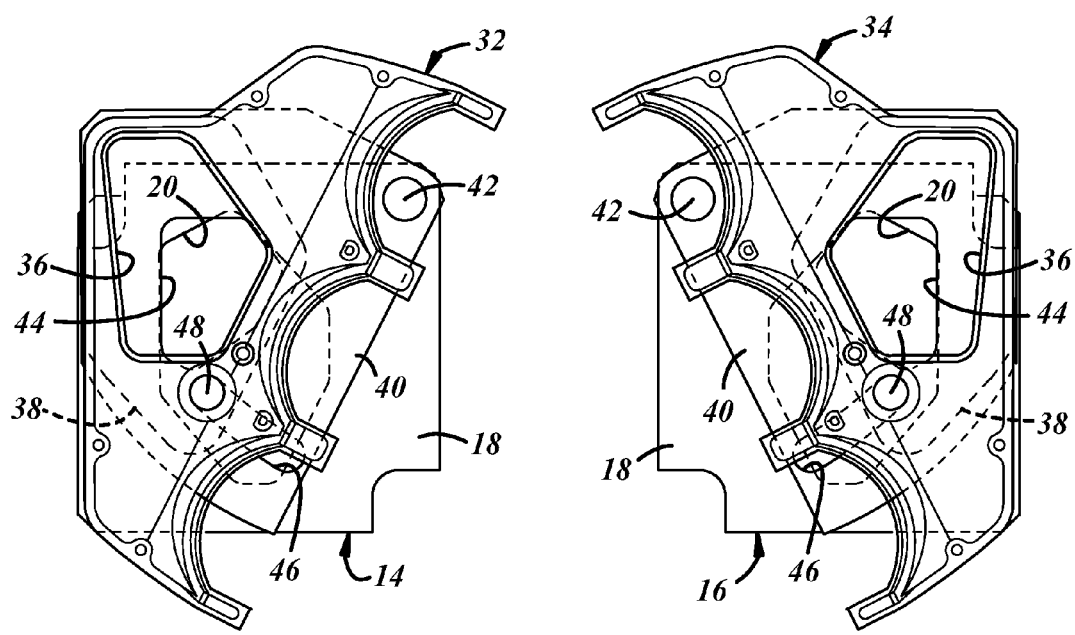
FIG. 6 is a top plan view similar to those of FIGS. 4 and 5 but with the mold arms in the fully open position.

Operation of the glassware mold cooling air supply is best described with respect to FIGS. 4-6. With the mold arms in the fully mold-closed position illustrated in FIGS. 1-2, the manifold shells and the various plates are in the positions illustrated in FIG. 4. Each valve plate opening 44 aligns with and overlaps associated manifold inlet opening 36 (in pressure plate 38). As the mold arms are moved from the fully closed positions of FIG. 4 through the intermediate positions of FIG. 5 toward the fully open positions of FIG. 6, pins 48 on pressure plates 38 move along slots 46 in valve plates 40 but initially do not move the valve plates. During this lost motion cooling air continues to flow from the section box through the aligned plate openings and the manifolds to the glassware molds. During further motion of the mold arms toward the fully open positions, from the positions of FIG. 5 toward the positions of FIG. 6, pins 48 engage the ends of slots 46 (see FIG. 5) and pivot valve plates 40 around respective pins 42 along with the mold arms. When the mold arms are thereafter moved from the fully open positions of FIG. 6 toward the fully closed positions of FIG. 4, pins 48 initially travel in slots 46 of valve plates 40 so that there again is lost motion between the plates as the valve plates do not move during such initial closing motions. After pins 48 reach the ends of slots 46 in valve plates 40, further motions of the mold arms toward the fully closed positions pivot the respective valve plates 40 toward the fully closed positions of FIG. 4.

Flow of cooling air between the section box and the glassware molds is controlled by the cross section to air flow through the various plate openings during motion of the mold arms. In the exemplary embodiment of the disclosure illustrated in the drawings, the plate openings preferably are such that cooling air flow to the glassware molds remains substantially constant during motion between the fully closed and fully open positions, and at the fully closed and fully open positions. However, a different air flow control scheme could be implemented by changing the sizes and/or the geometries of the plate openings.

There thus has been disclosed a glassware mold cooling air supply that fully satisfies all of the objects and aims previously set forth. The disclosure has been presented in conjunction with an exemplary embodiment, and modifications and variations have been discussed. Other modifications and variations will suggest themselves to persons of ordinary skill in the art in view of the foregoing description. The disclosure is intended to embrace all such modifications and variations as fall within the spirit and broad scope of the appended claims.

The invention claimed is:

1. A glassware forming machine that includes:
   a machine section box having an upwardly directed cooling air outlet opening,
   a mold arm disposed above said section box and movable between mold-open and mold-closed positions,
   an air manifold carried by said mold arm overlying said section box and said outlet opening for delivering cooling air to at least one glassware mold carried by said mold arm, said manifold having a cooling air inlet opening aligned with said cooling air outlet opening of said section box, and
   a valve plate mounted on said section box for movement overlying said outlet opening, and having a valve plate opening aligned with said outlet opening,
   said valve plate being operatively coupled to said mold arm such that position of said valve plate and overlap between said valve plate opening and said outlet opening vary as a function of motion of said mold arm between said mold-closed and mold-open positions.

2. The machine set forth in claim 1 wherein said valve plate is operatively coupled to said mold arm by a lost motion coupling such that motion of the mold arm is not imparted to the valve plate during initial motion in the opening and closing directions.

3. The machine set forth in claim 2 wherein said lost motion coupling includes a slot in one of said valve plate and said manifold, and a pin on the other of said valve plate and said manifold and disposed in said slot.

4. The machine set forth in claim 3 wherein said mold arm is carried for a pivotal motion between said mold-closed and mold-open positions, and wherein said slot is arcuate.

5. The machine set forth in claim 1 wherein said manifold includes a pressure plate on an undersurface of said manifold, said air inlet opening being disposed in said pressure plate, and at least one spring urging said pressure plate against said valve plate.

6. The machine set forth in claim 5 including a pair of said mold arms, an air manifold carried by each of said mold arms, a pressure plate underlying each of said manifolds and a valve plate underlying each of said pressure plates,
   said respective mold arms, respective manifolds, respective pressure plates and respective valve plates being mirror images of each other.

7. A glassware forming machine that includes a machine section box having a cooling air outlet opening, at least one mold-carrying arm disposed above said section box and movable between mold-open and mold-closed positions, and means for delivering cooling air from said outlet opening to said mold-carrying arm,
   characterized in that said means includes:
   a valve plate mounted on said section box to pivot around an axis, said valve plate having a valve plate opening that registers with said outlet opening in said section box,
   a pressure plate mounted on said mold-carrying arm overlying said valve plate and against said valve plate, said pressure plate having a pressure plate opening that registers with said valve plate opening in said valve plate, and
   a coupling between said valve plate and said pressure plate to pivot said valve plate on said section box as a function of motion of said mold-carrying arm between said mold-open and mold-closed positions.

8. A glassware forming machine that includes a machine section box having a cooling air outlet opening, at least one mold-carrying arm disposed above said section box and movable between mold-open and mold-closed positions, and means for delivering cooling air from said outlet opening to said mold-carrying arm, characterized in that said means includes:

a valve plate mounted on said section box to pivot around an axis, said valve plate having a valve plate opening that registers with said outlet opening in said section box, a pressure plate mounted on said mold-carrying arm overlying said valve plate, said pressure plate having a pressure plate opening that registers with said valve plate opening in said valve plate, and a coupling between said valve plate and said pressure plate to pivot said valve plate on said section box as a function of motion of said mold-carrying arm between said mold-open and mold-closed positions, wherein said coupling is a lost-motion coupling.

9. The machine set forth in claim 8 including at least one spring urging said pressure plate against said valve plate.

* * * * *